(12) United States Patent
Fan

(10) Patent No.: US 12,548,644 B2
(45) Date of Patent: Feb. 10, 2026

(54) ENTITY SEMANTIC RELATION CLASSIFICATION

(71) Applicant: New H3C Big Data Technologies Co., Ltd., Henan (CN)

(72) Inventor: Fangli Fan, Beijing (CN)

(73) Assignee: New H3C Big Data Technologies Co., Ltd., Zhengzhou (CN)

( * ) Notice: Subject to any disclaimer, the term of this patent is extended or adjusted under 35 U.S.C. 154(b) by 1070 days.

(21) Appl. No.: 17/287,476

(22) PCT Filed: Dec. 23, 2019

(86) PCT No.: PCT/CN2019/127449
§ 371 (c)(1),
(2) Date: Apr. 21, 2021

(87) PCT Pub. No.: WO2020/135337
PCT Pub. Date: Jul. 2, 2020

(65) Prior Publication Data
US 2021/0391080 A1    Dec. 16, 2021

(30) Foreign Application Priority Data
Dec. 29, 2018 (CN) .......................... 201811641958.3

(51) Int. Cl.
*G06F 40/30* (2020.01)
*G06F 18/214* (2023.01)
(Continued)

(52) U.S. Cl.
CPC ........... *G16H 10/60* (2018.01); *G06F 18/214* (2023.01); *G06F 18/22* (2023.01); *G06F 40/30* (2020.01); *G16H 50/70* (2018.01)

(58) Field of Classification Search
CPC ........ G16H 50/70; G16H 50/20; G16H 10/60; G06F 40/30; G06F 18/22; G06F 18/214
See application file for complete search history.

(56) References Cited

U.S. PATENT DOCUMENTS 9,412,052 B1 * 8/2016 Natarajan ............ G06V 30/164
11,328,006 B2    5/2022 Uchide
(Continued)

FOREIGN PATENT DOCUMENTS

CN    106407211 A    2/2017
CN    107220237 A    9/2017
(Continued)

OTHER PUBLICATIONS

Zhang et al. "Feature Fusion Text Classification Model Combining CNN and BiGRU with Multi-Attention Mechanism," Nov. 12, 2019, Future Internet 2019, <https://www.mdpi.com/1999-5903/11/11/237>, pp. 1-24. (Year: 2019).*
(Continued)

*Primary Examiner* — Kyle R Stork
(74) *Attorney, Agent, or Firm* — McDonnell Boehnen Hulbert & Berghoff LLP

(57) ABSTRACT

The examples of the present disclosure provide a method and apparatus for classifying an entity semantic relation, a model training method and apparatus, an electronic device, and relate to the field of text identification technology. A first entity and a second entity in a corpus is determined and obtained. According to a first position distance between each word in the corpus and the first entity and a second position distance between each word in the corpus and the second entity, a feature vector corresponding to each word is obtained. Then, feature vectors corresponding to all words in the corpus are combined to obtain a model input vector corresponding to the corpus. Then an entity semantic relation type corresponding to the corpus is obtained by using the model input vector corresponding to the corpus an input of the entity semantic relation classification model.

15 Claims, 5 Drawing Sheets

(51) Int. Cl.
*G06F 18/22* (2023.01)
*G16H 10/60* (2018.01)
*G16H 50/70* (2018.01)

(56) References Cited

U.S. PATENT DOCUMENTS

| | | | |
|---|---|---|---|
| 2015/0248397 A1* | 9/2015 | Burstein | G06F 40/35 |
| | | | 704/9 |
| 2016/0253309 A1* | 9/2016 | Zhao | G06F 40/211 |
| | | | 704/9 |
| 2017/0229115 A1* | 8/2017 | Lee | G10L 15/187 |
| 2018/0039555 A1* | 2/2018 | Salunke | G06F 11/3006 |
| 2018/0365220 A1* | 12/2018 | Chakraborty | G06F 40/30 |
| 2019/0164064 A1* | 5/2019 | Li | G10L 15/1822 |
| 2019/0258854 A1* | 8/2019 | Hosabettu | G06V 30/414 |

FOREIGN PATENT DOCUMENTS

| | | |
|---|---|---|
| CN | 107305543 A | 10/2017 |
| CN | 108268643 A | 7/2018 |
| CN | 108763555 A | 11/2018 |
| CN | 108875809 A | 11/2018 |
| CN | 109754012 A | 5/2019 |
| WO | 2019082362 A1 | 2/2020 |

OTHER PUBLICATIONS

International Search Report mailed on Mar. 12, 2020, issued in connection with International Application No. PCT/CN2019/127449, filed on Dec. 23, 2019, 6 pages.

Written Opinion mailed on Mar. 12, 2020, issued in connection with International Application No. PCT/CN2019/127449, filed on Dec. 23, 2019, 4 pages.

* cited by examiner

ENTITY SEMANTIC RELATION CLASSIFICATION

CROSS-REFERENCE TO RELATED APPLICATIONS

The present application is a U.S. National Phase Application under 35 U.S.C. § 371 of International Application No. PCT/CN2019/127449 filed Dec. 23, 2019, which claims priority to Chinese patent application No. 201811641958.3.0, filed with the China National Intellectual Property Administration on Dec. 29, 2018 and entitled "Entity semantic relation classification method, model training method, apparatus and electronic device", which are incorporated herein by reference in their entirety.

BACKGROUND

Deep learning is a method for representation learning of data in machine learning. In practical applications of deep learning, a deep learning model needs to be trained in advance.

Sample data used in training the deep learning model includes multi-dimension feature data. The deep learning model is continuously trained with the sample data to obtain an accurate prediction model. The prediction model is used to perform a data prediction operation online.

Figure 1:
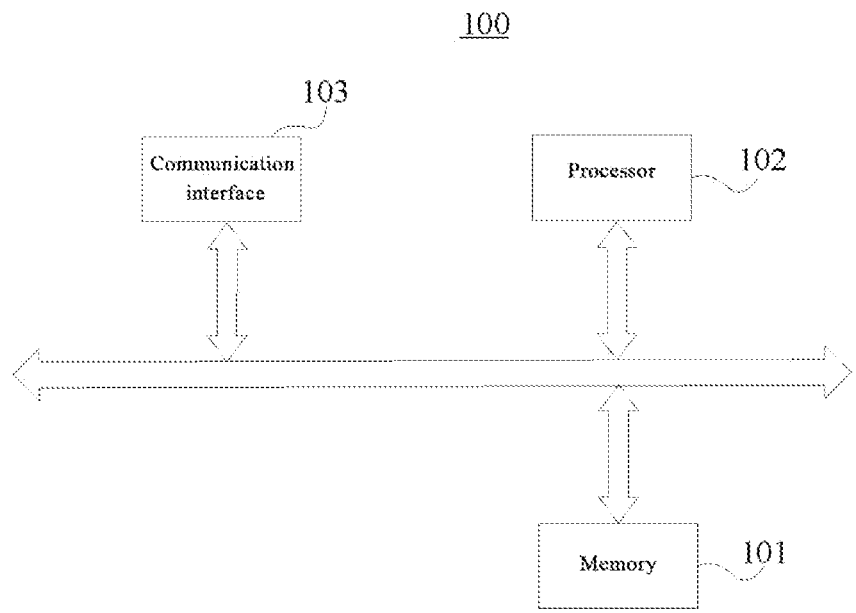
FIG. 1 is a schematic structural block diagram of an electronic device according to an example of the present disclosure.

In the figures: 100—electronic device; 101—memory; 102—processor; 103—communication interface; 400—apparatus for training an entity semantic relation classification model; 401—transceiver module; 402—second processing module; 403—training module; 500—apparatus for classifying an entity semantic relation; 501—first processing module; 502—identification module.

DETAILED DESCRIPTION

In order to make objectives, technical solutions and advantages of examples of the present disclosure more clear, the technical solutions of the examples of the present disclosure will be described in detail below with reference to the drawings in the examples of the present disclosure. Obviously, the examples described are only some, and not all, of the examples of the present disclosure. In general, the components of the examples of the present disclosure, which are described and illustrated in the drawings, may be arranged and designed in a variety of configurations.

Therefore, the following detailed description of the examples of the present disclosure provided in the drawings is not intended to limit the scope of the disclosure, but merely represents selected examples of the present disclosure. All other examples obtained based on the examples of the present disclosure by those skilled in the art without any creative efforts fall into the scope of protection defined by the present disclosure.

It should be noted that like reference signs and letters refer to like elements in the drawings, therefore. Once an element is defined in one figure, it need not be further defined and explained in subsequent figures. Meanwhile, in the description of the examples of the present disclosure, terms "first", "second", and the like are only used to distinguish descriptions, and cannot be understood to indicate or imply relative importance.

The relationship terms used herein, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

Some implementations of the present disclosure will be described in detail below with reference to the drawings. The following examples and features in the examples may be combined with each other without conflict.

In a task of text information extraction, a deep learning model can be used to deeply mine text information based on entity identification, thereby promoting the structuration of unstructured sentences. An entity is a naming element, such as a person name, a place name, a device name, a disease name, and the like. Of course, it can be understood that in different fields, various types of entities may be defined accordingly.

In an application scenario of classifying semantic relations between entities in a corpus, the entity semantic relations are generally classified by a classification method based on a neural network model. Specifically, the neural network model is trained by using a large number of corpora in which the entity semantic relations have been classified as inputs of the neural network model, and then entity semantic relations of a new corpus is classified by the trained neural network model. For example, the entity semantic relations are classified by a convolutional neural network based model, such as RNTN (Recursive Neural Tensor Network), PCNN (Pulse Coupled Neural Network) and the like. However, the accuracy of these models to classify the entity semantic relations of corpora in some fields may not meet the requirements.

For example, Electronic Medical Records (EMR) are used as text information extraction objects. The electronic medical records record patient's diseases and symptoms, treatment processes and treatment effects. Based on an established deep learning model, entities in the electronic medical records are mined and entity semantic relations are classified. However, the accuracy of the classification of the entity semantic relations is not high, which makes it impossible to collect past clinical information as historical data more efficiently and accurately to assist in medical decision-making.

Referring to FIG. 1, FIG. 1 is a schematic structural block diagram of an electronic device 100 according to an example of the present disclosure. The electronic device 100 may be, but is not limited to, a server, a personal computer (PC), a tablet computer, a smart phone, a personal digital assistant (PDA), and the like. The electronic device 100 includes a memory 101, a processor 102, and a communication interface 103. The memory 101, the processor 102, and the communication interface 103 are directly or indirectly electrically connected to each other to implement data transmission or interaction. For example, the memory 101, the processor 102, and the communication interface 103 may be electrically connected to each other through one or more communication buses or signal lines. The memory 101 may be used to store program instructions and modules, such as program instructions/modules for an apparatus 400 for training an entity semantic relation classification model provided by the example of the present disclosure, and program instructions/modules for an apparatus 500 for classifying an entity semantic relation. The processor 102 performs various functional applications and data processing by executing the program instructions and modules stored in the memory 101. The communication interface 103 may be used to perform signaling or data communication with other node devices.

The memory 101 may be, but is not limited to, Random Access Memory (RAM), Read Only Memory (ROM), Programmable Read-Only Memory (PROM), Erasable Programmable Read-Only Memory (EPROM), Electric Erasable Programmable Read-Only Memory (EEPROM), and the like.

The processor 102 may be an integrated circuit chip with a signal processing capability. The processor 102 may be a general-purpose processor, including but not limited to Central Processing Unit (CPU), Digital Signal Processing (DSP), Neural-Network Process Units (NPU) and the like. The processor 102 may also be Application Specific Integrated Circuit (ASIC), Field-Programmable Gate Array (FPGA), or other programmable logic devices, discrete gates or transistor logic devices, discrete hardware components, and the like.

It can be understood that the structure shown in FIG. 1 is merely for illustration, and the electronic device 100 may include more or less components than those shown in FIG. 1, or have a different configuration from that shown in FIG. 1. The components shown in FIG. 1 may be implemented by hardware, software, or a combination thereof.

A method for training an entity semantic relation classification model provided by the example of the present disclosure is described below by taking the mining of entities in a corpus and the classifying of entity semantic relations as an example, so as to use the trained entity semantic relation classification model to classify the entity semantic relations in the corpus.

Figure 2:
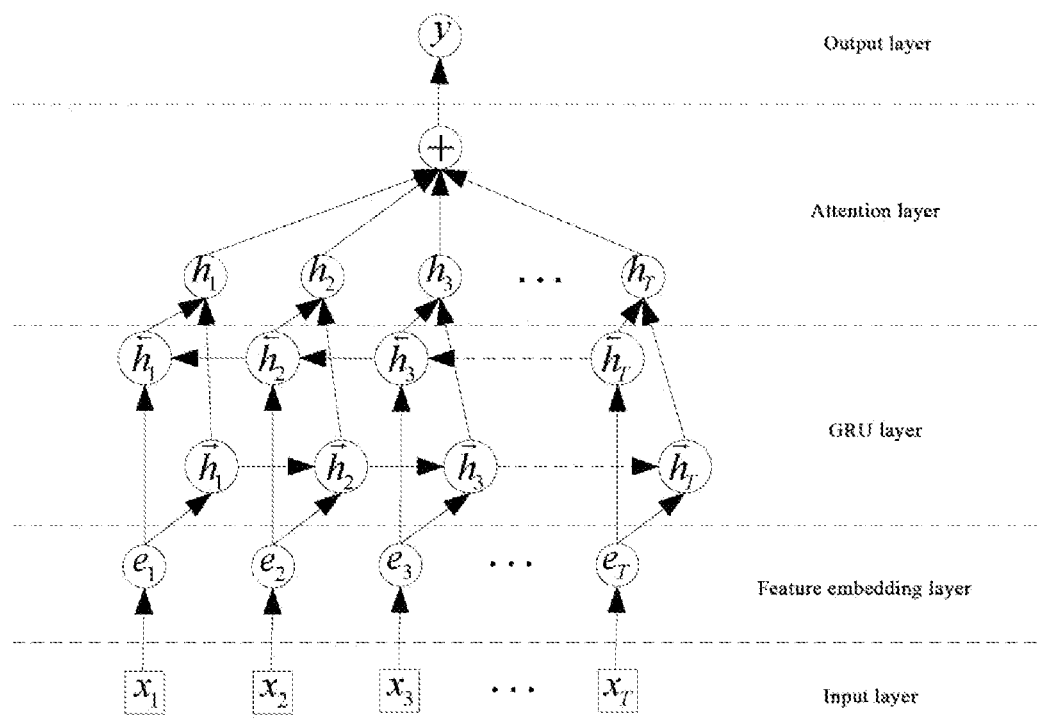
FIG. 2 is a schematic structural diagram of an entity semantic relation classification model according to an example of the present disclosure.

In an example, referring to FIG. 2, FIG. 2 is a schematic structural diagram of an entity semantic relation classification model according to an example of the present disclosure. As a possible implementation, the entity semantic relation classification model may be a model of a combination of BiGated Recurrent Unit (BiGRU) with Attention mechanism. Specifically, the entity semantic relation classification model adds an attention layer before an output layer of the BiGRU model.

As a possible implementation, in the BiGRU+Attention model (i.e., entity semantic relation classification model), the level of the GRU layer is set to 1, and the number of neurons in the GRU layer is set to 230. In specific practice, a user may also set the level of the GRU layer to 2 or other values according to actual needs, and accordingly set the number of neurons in the GRU layer to other numbers. The example of the present disclosure provides only one possible implementation, and does not limit the specific number.

As a possible implementation manner, a Dropout parameter of the BiGRU+Attention model is set to 1, that is, each neuron of the GRU layer in the BiGRU+Attention model is not discarded during training. Of course, in practice, the user may also set the Dropout parameter to other values as needed, to determine that some neurons in the GRU layer are inactivated. The example of the present disclosure provides one possible implementation through repeat implementations, and does not limit the specific number.

In some other implementations of the present disclosure, the entity relation semantic classification model may also be other models, such as a GRU model. An example of the present disclosure is described based on the BiGRU+Attention model.

Figure 3:
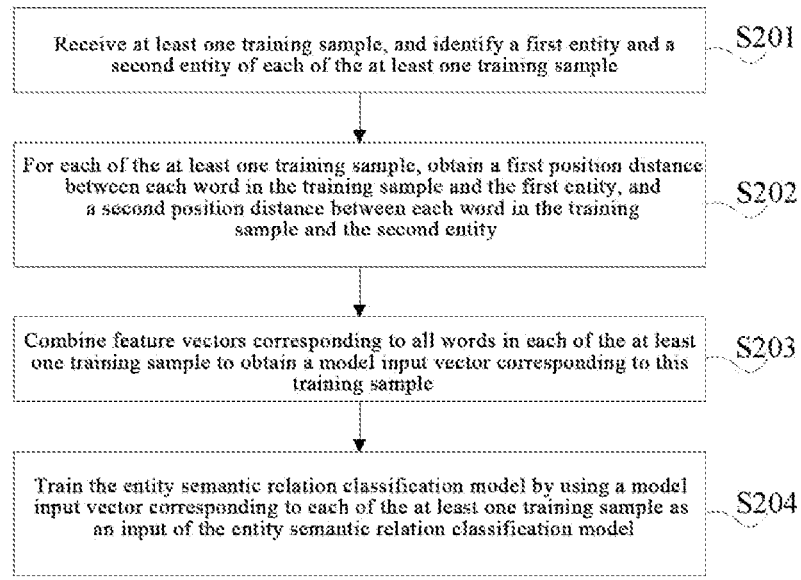
FIG. 3 is a schematic flowchart of a method for training an entity semantic relation classification model according to an example of the present disclosure.

Referring to FIG. 3, FIG. 3 is a schematic flowchart of a method for training an entity semantic relation classification model according to an example of the present disclosure. The method for training an entity semantic relation classification model is applicable to the electronic device 100 shown in FIG. 1, and the electronic device 100 uses the entity semantic relation classification model to classify the semantic relations of entities in the corpus. The method for training an entity semantic relation classification model includes the following blocks.

At block S201, at least one training sample is received, and a first entity and a second entity of each of the at least one training sample are identified.

One or more training samples may be received at a time, which can be adjusted by a user as needed in practice.

At block S202, a first position distance between each word in each training sample and the first entity of this training sample and a second position distance between each word in each training sample and the second entity of this training sample are obtained.

That is, the block S202 refers to: for each training sample, obtaining a first position distance between each word in the training sample and the first entity of the training sample, and a second position distance between each word in the training sample and the second entity of the training sample.

At block S203, feature vectors corresponding to all words in each training sample are combined to obtain a model input vector corresponding to this training sample.

That is, the block S203 refers to: for each training sample, combining feature vectors corresponding to all words in this training sample to obtain a model input vector corresponding to this training sample.

The feature vector corresponding to each word is obtained by combining a word vector and a position embedding vector corresponding to this word. The position embedding vector corresponding to each word includes a vector corresponding to the first position distance of this word, and a vector corresponding to the second position distance of this word. That is, for each word, a feature vector corresponding to this word is obtained by combining a word vector and a position embedding vector corresponding to this word, and the position embedding vector corresponding to this word includes a vector corresponding to the first position distance of this word, and a vector corresponding to the second position distance of this word.

At block S204, the entity semantic relation classification model is trained by using the model input vector corresponding to each training sample as an input of the entity semantic relation classification model.

In training the entity semantic relation classification model, it is necessary to input all training samples into the entity semantic relation classification model in batches. The number of training samples includes in each batch is called batch_size, and the number of times that each training sample is used is called epochs.

In an example, in training the entity semantic relation classification model, training parameters may be set as follows: batch_size is set to 50; epochs is set to 100, that is, each training sample is used 100 times; the model is saved whenever the model is trained 100 times. The training parameters means that the entity semantic relation classification model is trained with 50 training samples each time; each training sample is used 100 times; and the entity semantic relation classification model is saved whenever the model is trained 100 times.

In this example, when using each batch of training samples to train the entity semantic relation classification model, the electronic device needs to receive 50 training samples and identify the first entity and the second entity in each training sample, wherein the first entity and the second entity in each training sample form an entity pair.

As a possible implementation, before the entity semantic relation classification model is trained with training samples, each of entities in the training samples has an entity identifier, and the electronic device identifies entity identifiers in each training sample to obtain the first entity and the second entity in this training sample.

For example, an electronic medical record is taken as a training sample. Assume one training sample is "心前区无<e1>隆起 symptom</e1>，凹陷，心尖搏动正常，无心包摩擦感，心脏相对浊音界正常，<e2>心率 test</e2>70 次/分，心律齐，心脏各瓣膜听诊区未闻及病理性杂音". The <e1> </e1> is the identifier of the first entity, and the <e2> </e2> is the identifier of the second entity. When receiving the training sample, the electronic device obtain the first entity being "隆起" and the type thereof being symptom by identifying the <e1> </e1>, and obtain the second entity being "心率" and the type thereof being test by identifying the <e2> </e2>.

In some other implementations of the example of the present disclosure, the first entity and the second entity in the training sample may also be identified in other ways. For example, by presetting one entity library and storing multiple entities in the entity library, the training sample is identified by searching for the preset entity library to obtain the first entity and the second entity.

In an application scenario such as the above electronic medical record, the positions of respective words in a single training sample with respect to the first entity and the second entity are different, then the contribution of each word to the identifying of entity semantic relation types of the first entity and the second entity is also different. In general, the closer a word is to the two entities, the more likely the word is to make a greater contribution to the identifying of entity semantic relation types of the two entities.

Therefore, in the example of the present disclosure, a concept of position embedding is introduced. In training an entity semantic relation classification model, for each training sample, a first position distance between each word in the training sample and the first entity of the training sample, and a second position distance between each word in the training sample and the second entity of the training sample are obtained.

In addition, since an entity is generally composed of multiple words, such as "隆起" and "心率" in the above example, in order to obtain the first position distance and the second position distance of each word in each training sample, calculation references for the first position distance and the second position distance in the training sample may be determined in advance. For example, it is possible to specify that in calculating the first position distance, a first word in the first entity is used as the calculation reference of the first position distance in a word order; and in calculating the second position distance, a first word in the second entity is used as the calculation reference of the second position distance in the word order.

For example, in the above exemplary training sample, i.e., "心前区无<e1>隆起 symptom</e1>，凹陷，心尖搏动正常，无心包摩擦感，心脏相对浊音界正常，<e2>心率 test</e2>70 次/分，心律齐，心脏各瓣膜听诊区未闻及病理性杂音", if the first position distance and the second position distance are calculated by the above specified calculation references, then a first position distance and a second position distance of a word "前" in a string "心前区" are 3 and 33, respectively; and a first position distance and a second position distance of a word "区" in the string "心前区" is 2 and 32, respectively.

The position distances of two different words from the same entity may be the same. The difference is that one word is in front of the entity and the other word is behind the entity in the word order. For example, in the exemplary training sample described above, the first position distance of the word "区" in the string "心前区" from the first entity "隆起" is 2, and the first position distance of the word "凹" in the string "凹陷" from the first entity "隆起" is also 2.

Therefore, as a possible implementation, the directions of the position distances may be distinguished by positive and negative values. A position distance of a word in front of the entity in a word order is represented by a negative value, and a position distance of a word behind the entity in the word order is represented by a positive value. For example, in the above example, in the word order, the word "区" in the string "心前区" is located in front of the first entity "隆起", and the word "凹" in the string "凹陷" is located behind the first entity "隆起", then the first position distance of the word "区" is −2, and the first position distance of the word "凹" is 2.

As another possible implementation, on the basis of distinguishing directions of the position distances by positive and negative values, one preset value may be added to a value of each position distance, so that the value of each position distance is changed to a positive value. For example, in the above exemplary training sample, if a preset value is 68, the first position distance of the word "区" is −2+68=66, and the first position distance of the word "凹" is 2+68=70.

According to the above obtained first position distance and second position distance of each word in each training sample, each word is vectorized to obtain a word vector, each first position distance is vectorized to obtain a position embedding vector, and each second position distance is vectorized to obtain a position embedding vector, by a word vector table for converting a word into a vector and a position embedding vector table for converting a position distance into a vector. Then, for each word, the word vector of this word, the position embedding vector corresponding to the first position distance of this word and the position embedding vector corresponding to the second position distance of this word are combined to obtain a feature vector corresponding to this word.

For example, in the above exemplary training sample, the word "前" in the string "心前区" is taken as an example. Assuming that the word vector obtained by vectorizing the word "前" is [0.1, 0.5, 0.4, 0.3], the vector corresponding to the first position distance of the word "前" is [0.4, 0.6], and the vector corresponding to the second position distance of the word "前" is [0.6, 0.4], then the feature vector corresponding to the word "前" [0.1, 0.5, 0.4, 0.3, 0.4, 0.6, 0.6, 0.4].

The 4-dimensional word vector [0.1, 0.5, 0.4, 0.3] obtained by vectorizing the word "前" is only exemplary. In some other implementations of the present disclosure, it is also possible to use a word vector table of other dimensions pre-stored in the electronic device, so as to vectorize the word "前" to obtain a word vector of a different dimension. For example, the word "前" is vectorized to obtain a 100-dimension word vector by a 100-dimension word vector table pre-stored in the electronic device.

Similarly, the vector corresponding to the first position distance and the vector corresponding to the second position distance are 2-dimension vectors for exemplary illustration. In some other implementations of the present disclosure, a position embedding vector table of other dimensions pre-stored in the electronic device may also be used, such as a 4-dimension position embedding vector table.

In the example of the present disclosure, after the feature vector of each word is obtained, feature vectors corresponding to all words in each training sample are combined to obtain a model input vector corresponding to this training sample. As a possible implementation, a model input vector corresponding to each training sample is recorded in a two-dimensional matrix.

For example, in the above exemplary training sample, the feature vector corresponding to the word "心" in the string "心前区" is taken as a first row of a model input vector, the feature vector corresponding to the word "前" in the string "心前区" is taken as a second row of the model input vector, and so on, until the feature vectors corresponding to all of the words in the training sample are combined to obtain the model input vector corresponding to the training sample.

Therefore, based on the obtained model input vector corresponding to each training sample, the entity semantic relation classification model is trained by using the model input vector corresponding to each training sample as an input of the entity semantic relation classification model.

As a possible implementation, when a model input vector is used as an input of an entity semantic relation classification model, model input vectors corresponding to multiple training samples may be together used as the input of the entity semantic relation classification model. For example, if batch_size is set to 50 in the setting of the above training parameters, then model input vectors corresponding to 50 training samples are inputted into the entity semantic relation classification model at a time.

In the above example in which model input vectors corresponding to 50 training samples are inputted into the entity semantic relation classification model at a time, each model input vector has the same dimension. For example, in case the number of dimensions of a word vector is 100 dimensions and the number of dimensions of a position embedding vector is 4 dimensions, the number of dimensions of a model input vector of a training sample 1 is 70*108, and the number of dimensions of a model input vector of a training sample 2 is also 70*108. 70 represents that the training sample includes 70 words, and 108 represents that a feature vector corresponding to each word includes 108 elements, which includes 100 elements in the word vector, 4 elements in the position embedding vector corresponding to the first position distance, and 4 elements in the position embedding vector corresponding to the second position distance.

Furthermore, in case multiple training samples are together used as the input of the entity semantic relation classification model, model input vectors corresponding to the multiple training samples is to be unified, since the number of words contained in different training samples may be different, for example, training sample 1 contains 60 words, training sample 2 contains 70 words, and training sample 3 contains 73 words. That is, the number of dimensions of the model input vectors corresponding to the multiple training samples is unified. For example, the dimensions of the model input vectors are uniformly set to 70*108. If a vector with 60*108 dimensions (60<70) is obtained by combining feature vectors corresponding to all words in training sample 1, the shortage of the training sample 1 may be filled with a preset vector, such as 0 vector, so as to obtain a model input vector with 70*108 dimensions corresponding to the training sample 1. In addition, if a vector with 73*108 dimensions (73>70) is obtained by combining feature vectors corresponding to all words in training sample 3, a part of the training sample 3 that exceeds 70 words may be removed, and only feature vectors corresponding to first 70 words in word order are retained, so as to obtain a model input vector with 70*108 dimensions corresponding to the training sample 3.

As a possible implementation, the above training sample may be an electronic medical record, and a model input vector corresponding to the training sample is a combination of n feature vectors. For example, in the above example, the dimensions of the model input vector are set to 70*108, which represents that the model input vector contains feature vectors corresponding to 70 words, and the dimensions of each feature vector are 108.

As a possible implementation, n is an average number of words contained in at least one electronic medical record (that is, the above training sample). For example, if 50 electronic medical records are used as the training samples, and the average number of words contained in the 50 electronic medical records is 70, then n is equal to 70.

It can be understood that, in some other implementations of the present disclosure, n may also be set to a fixed value, for example, 100.

In some other implementations of the present disclosure, corpora other than the electronic medical record may also be used as training samples, for example, intelligent customer service dialogue or consultation information.

As another possible implementation, when a model input vector is used as an input of an entity semantic relation classification model, a model input vector corresponding to a single training sample may be used as an input of the entity semantic relation classification model. For example, if the batch_size is set to 1 in the setting of above training parameters, then a model input vector corresponding to one training sample is inputted into the entity semantic relation classification model at a time.

The training process of a model input vector with, for example, 70*108 dimensions is described by means of examples below with reference to the entity semantic relation classification model shown in FIG. 2. In a model shown in FIG. 2, T=108. An input layer of the model obtains a model input vector with 70*108 dimensions, and the model input vector is preprocessed by a feature embedding layer and then input to a GRU layer for calculation; the GRU layer outputs 108 predicted entity semantic relation types to an attention layer; the attention layer calculates, according to the obtained 108 predicted entity semantic relation types, a probability value of each predicted entity semantic relation type, and uses an entity semantic relation type with the largest probability value in the obtained 108 predicted entity semantic relation types as an entity semantic relation type corresponding to the training sample.

For example, in one of the above possible implementations, if the entity semantic relation classification model is trained by using the model input vectors corresponding to the multiple training samples together as the input of the entity semantic relation classification model, then during training, the entity semantic relation classification model may obtain a predicted entity semantic relation type for each training sample. For example, in the above example, if model input vectors corresponding to 50 training samples are input, the entity semantic relation classification model may obtain predicted entity semantic relations types corresponding to 50 training samples.

Figure 4:
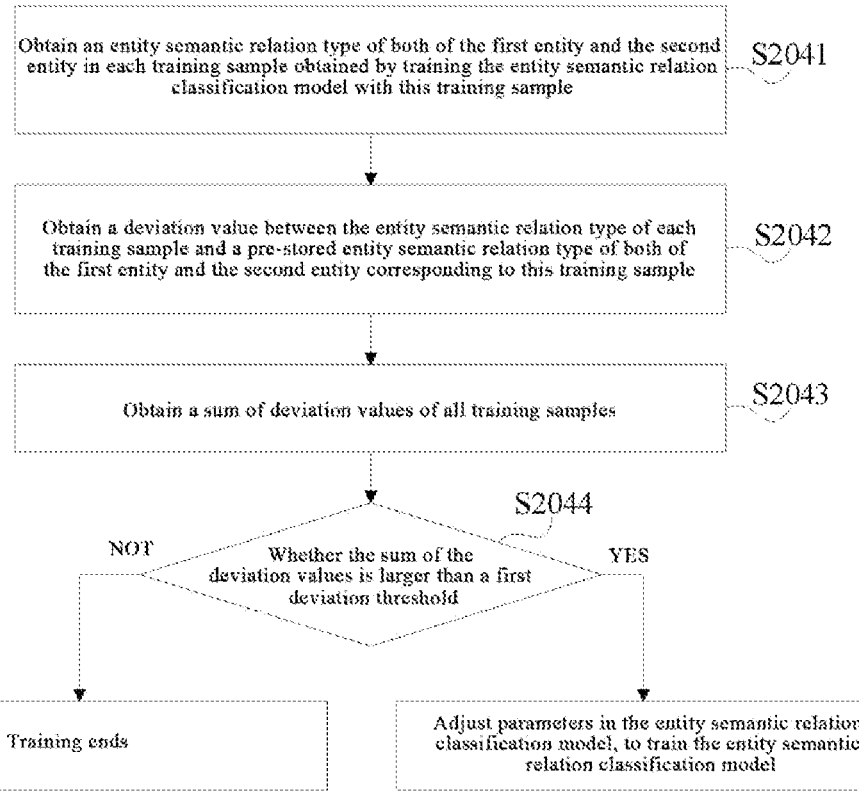
FIG. 4 is a schematic flowchart of sub-steps of S204 in FIG. 3.

Therefore, referring to FIG. 4, FIG. 4 is a schematic flowchart of sub-steps of S204 in FIG. 3. As a possible implementation, S204 includes the following blocks.

At block S2041, an entity semantic relation type of both of the first entity and the second entity of each training sample is obtained, wherein the entity semantic relation type is obtained by training the entity semantic relation classification model with the training sample.

That is, the block S2041 refers to: obtaining a predicted entity semantic relation type corresponding to each training sample obtained by the entity semantic relation classification model by using a model input vector corresponding to each training sample as an input of the entity semantic relation classification model, wherein the predicted entity semantic relation type is a predicted entity semantic relation type of both of the first entity and the second entity in this training sample.

At block S2042, a deviation value between the entity semantic relation type of each training sample and a pre-stored entity semantic relation type of both of the first entity and the second entity corresponding to this training sample is obtained.

That is, the block S2042 refers to: obtaining a deviation value between a predicted entity semantic relation type and a preset entity semantic relation type corresponding to each training sample, wherein the preset entity semantic relation type is the pre-stored entity semantic relation type of both of the first entity and the second entity corresponding to each training sample.

At block S2043, a sum of deviation values of all of the training samples is obtained.

At block S2044, it is determined whether the sum of the deviation values is larger than a first deviation threshold; if the sum of the deviation values is larger than the first deviation threshold, the parameters in the entity semantic relation classification model are adjusted to train the entity semantic relation classification model; if the sum of the deviation values is not larger than the first deviation threshold, the training ends.

For example, a cross entropy function may be used to calculate the deviation value of each training sample. For example, the predicted entity semantic relation type and the preset entity semantic relation type corresponding to each training sample is used as an input of the cross entropy function, and a obtained cross entropy function value corresponding to each training sample is used as the deviation value of each training sample. Then, the deviation values of all of the training samples in one training process are added together to obtain the sum of the deviation values of all of the training samples in the training process. The sum of the deviation values represents an overall deviation degree of the training process. For example, in the above example where the batch_size is set to 50, the sum of the deviation values is a result obtained by adding the deviation values of 50 training samples together. If the sum of the deviation values is larger than the first deviation threshold, it is indicated that the overall deviation degree of the training process is large, and the entity semantic relation type predicted by the entity semantic relation classification model is significantly different from an actual entity semantic relation type. Thus, the parameters in the entity semantic relation classification model are adjusted to train the entity semantic relation classification model. Conversely, if the sum of the deviation values is not larger than the first deviation threshold, it is indicated that the entity semantic relation type predicted by the entity semantic relation classification model is close to the actual entity semantic relation type, and thus the training result meets the training requirement. As such, it is determined that the training of the model ends.

In the above training process, the parameters of the entity semantic relation classification model are adjusted based on an overall deviation degree of a single training of the entity semantic relation classification model. As another possible implementation, the parameters of the entity semantic relation classification model can also be adjusted based on an output result of a single training sample.

Figure 5:
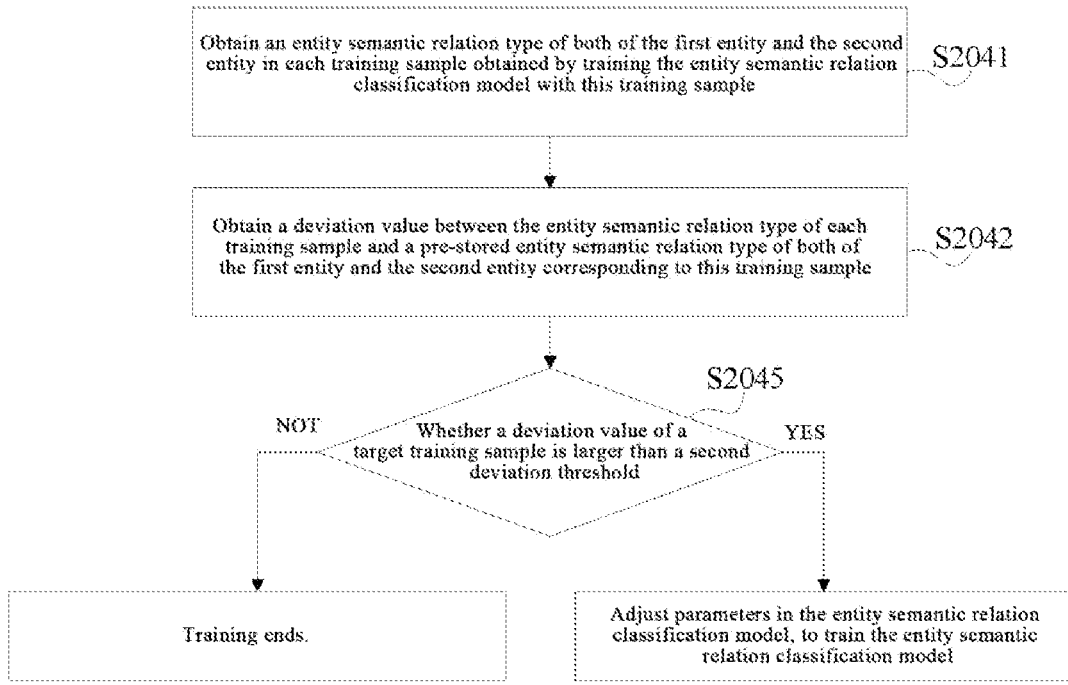
FIG. 5 is another schematic flowchart of sub-steps of S204 in FIG. 3.

Referring to FIG. 5, FIG. 5 is another schematic flowchart of sub-steps of S204 in FIG. 3. S204 further includes the following blocks.

At block S2041, an entity semantic relation type of both of the first entity and the second entity of each training sample is obtained, wherein the entity semantic relation type is obtained by training the entity semantic relation classification model with the training sample.

S2042, a deviation value between the entity semantic relation type of each training sample and a pre-stored entity semantic relation type of the first entity and the second entity corresponding to this training sample is obtained.

S2045, it is determined that whether a deviation value of a target training sample is larger than a second deviation threshold; if the deviation value of the target training sample is larger than the second deviation threshold, the parameters in the entity semantic relation classification model are adjusted to train the entity semantic relation classification model; if the deviation value of the target training sample is not larger than the second deviation threshold, the training ends.

In the above example, a cross entropy function is used to calculate the deviation value of each training sample, and a target training sample is determined in all of the training samples input into the entity semantic relation classification model. If a deviation value of the target training sample is larger than the second deviation threshold, it is indicated that the training process does not meet the training requirement. Thus, the parameters in the entity semantic relation classification model are adjusted to train the entity semantic relation classification model. Conversely, if the deviation value of the target training sample is not larger than the second deviation threshold, it is indicated that the training result meets the training requirement, and thus it is determined that the training of the model ends.

The target training sample may be any one of all of the training samples input into the entity semantic relation classification model, may be any one training sample whose deviation value is larger than the second deviation threshold, or may be each of all of the training samples in such a way that all of the training samples input into the entity semantic relation classification model are traversed in sequence. In some other implementations of the present disclosure, a training sample with the largest deviation value in all of the training samples input into the model may be used as the target training sample.

In the method shown in FIG. 4, the parameters of the entity semantic relation classification model are adjusted based on an overall deviation degree of a single training, while in the method shown in FIG. 5, the parameters of the entity semantic relation classification model are adjusted based on an output result of a single training sample. The user may adjust the parameters of the entity semantic relation classification model by different methods as needed.

As a possible implementation, in the example of the present disclosure, if the entity semantic relation classification model is BiGRU+Attention model as shown in FIG. 2, then in adjusting the parameters in the entity semantic relation classification model to train the entity semantic relation classification model, a weight coefficient and an offset coefficient of a GRU layer, and an attention matrix of an attention layer in the BiGRU+Attention model are adjusted, thereby achieving a purpose of training the entity semantic relation classification model.

The following is an example of mining entities in a corpus and classifying an entity semantic relation. A method for classifying an entity semantic relation according to the example of the present disclosure is described on the basis of the entity semantic relation classification model that are trained and obtained by the above method for training an entity semantic relation classification model.

Figure 6:
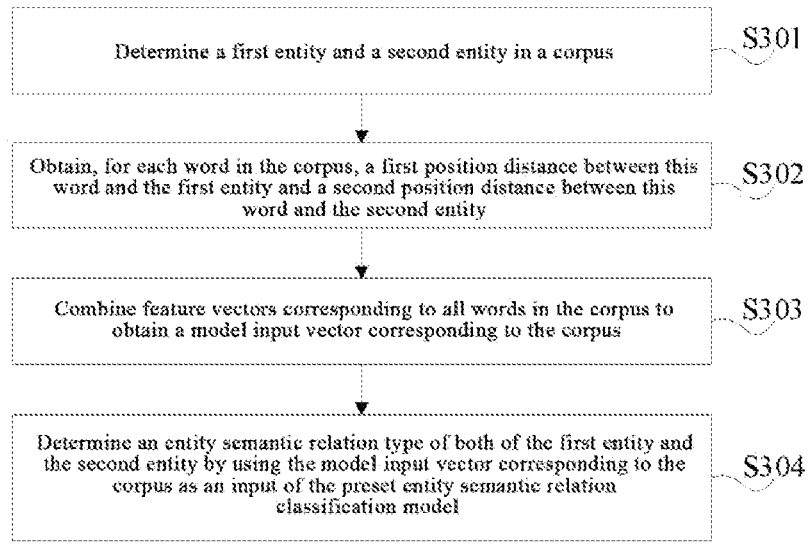
FIG. 6 is a schematic flowchart of a method for classifying an entity semantic relation according to an example of the present disclosure.

Referring to FIG. 6, FIG. 6 is a schematic flowchart of an method for classifying an entity semantic relation according to an example of the present disclosure. The method for classifying an entity semantic relation is applicable to the electronic device 100 shown in FIG. 1, and the method for classifying an entity semantic relation includes the following blocks.

At block S301, a first entity and a second entity in a corpus are determined.

At block S302, a first position distance between each word and the first entity in the corpus and a second position distance between each word and the second entity in the corpus are obtained.

At block S303, feature vectors corresponding to all words in the corpus are combined to obtain a model input vector corresponding to the corpus. A feature vector corresponding to each word is obtained by combining a word vector and a position embedding vector corresponding to this word in the corpus. The position embedding vector corresponding to each word includes a vector corresponding to the first position distance of this word, and a vector corresponding to the second position distance of this word.

At block S304, an entity semantic relation type of both of the first entity and the second entity is determined by using the model input vector corresponding to the corpus as an input of a preset entity semantic relation classification model.

That is, the block S304 refers to: determining an entity semantic relations type of both of the first entity and the second entity by using the model input vector corresponding to the corpus as an input of the entity semantic relation classification model.

As a possible implementation, the corpus may be an electronic medical record. For example, the electronic medical record "心前区无<e1>隆起 symptom</e1>, 凹陷, 心尖搏动正常, 无 心包摩擦感, 心脏相对浊音界正常, <e2>心率 test</e2>70 次/分, 心律齐 心脏各瓣膜听诊区未闻及病理性杂音" is taken as an example to illustrate the above method for classifying an entity semantic relation.

As a possible implementation, in obtaining an entity semantic relation type between a pair of entities in the corpus, the electronic device may determine that the first entity in the corpus is "隆起" and the second entity is "心率" through entity identifiers "e1> </e1>" and "<e2> </e2>" contained in the corpus.

Alternatively, in another possible implementation, one entity library preset in the electronic device may also be used. Multiple entities are pre-stored in the entity library. The electronic device identifies the corpus by searching the preset entity library, to obtain the first entity "隆起" and the second entity "心率" described above.

In the example of the present disclosure, according to a position distance between each word and the first entity "隆起" and a position distance between each word and the second entity "心率" in the corpus, a first position distance between each word and the first entity and a second position distance between each word and the second entity are obtained; then, for each word, a word vector corresponding to this word, a vector corresponding to the first position distance of this word and a vector corresponding to the second position distance of this word are combined to obtain a feature vector corresponding to this word; then, feature vectors corresponding to all words in the corpus are combined to obtain a model input vector corresponding to the corpus; and then an entity semantic relation type of both of the first entity "隆起" and the second entity "心率" in the corpus is determined by using the model input vector as an input of the entity semantic relation classification model in the electronic device.

Based on the above design, in the method for training an entity semantic relation classification model according to the example of the present disclosure, the first entity and the second entity in the corpus are determined, and a feature vector corresponding to each word in the corpus is obtained according to the first position distance between this word and the first entity and the second position distance between this word and the second entity; then, feature vectors corresponding to all words in the corpus are combined to obtain a model input vector corresponding to the corpus; and then the model input vector corresponding to the corpus is used as an input of the entity semantic relation classification model, to obtain an entity semantic relation type corresponding to the corpus. Compared with related technology, the method of the present disclosure can improve the accuracy of classifying an entity semantic relation.

Figure 7:
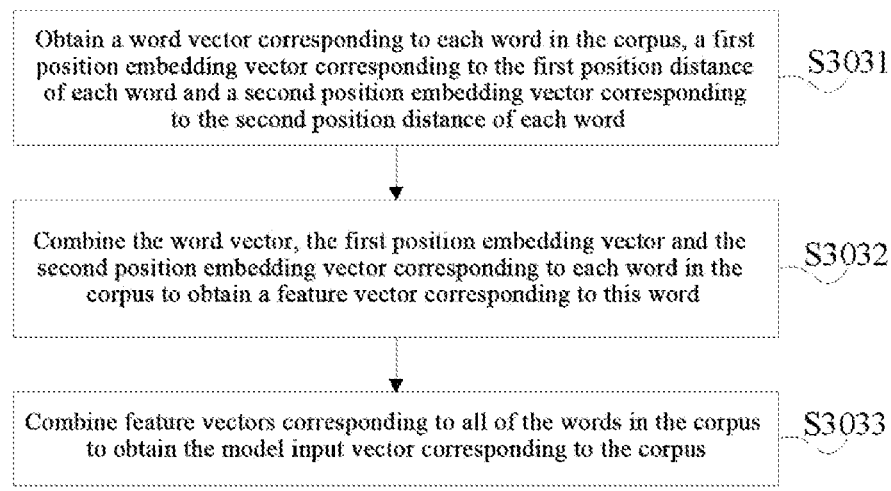
FIG. 7 is a schematic flowchart of sub-steps of S303 in FIG. 6.

In an example, referring to FIG. 7, FIG. 7 is a schematic flowchart of sub-steps of S303 in FIG. 6. As a possible implementation, S303 includes the following blocks.

At block S3031, a word vector corresponding to each word in a corpus, and a first position embedding vector and a second position embedding vector corresponding to the first position distance and the second position distance of each word respectively are obtained.

That is, the block S3031 refers to: obtaining a word vector corresponding to each word in a corpus, a first position embedding vector corresponding to the first position distance of each word and a second position embedding vector corresponding to the second position distance of each word.

At block S3032, the word vector, the first position embedding vector and the second position embedding vector corresponding to each word are combined to obtain a feature vector corresponding to this word.

At block S3033, feature vectors corresponding to all words in the corpus are combined to obtain a model input vector corresponding to the corpus.

The above corpus "心前区无 <e1>隆起 symptom</e1>, 凹陷, 心尖搏动正常, 无心包摩擦感, 心脏相对浊音界正常, <e2>心率 test</e2>70 次/分, 心律齐 心脏各瓣膜听诊区未闻及病理性杂音" is taken as an example in obtaining the model input vector corresponding to the corpus by the electronic device. First, the electronic device obtains the feature vector corresponding to each word in the corpus. The word "心" in the string "心前区" is taken as an example. A word vector is obtained by vectorizing the word "心", a first position embedding vector is obtained by vectorizing the first position distance between the word "心" and the first entity "隆起", and a second position embedding vector is obtained by vectorizing the second position distance between the word "心" and the second entity "心率". Then, the word vector, the first position embedding vector and the second position embedding vector corresponding to the word "心" are combined to obtain a feature vector corresponding to the word "心".

A feature vector corresponding to each word is obtained in a similar manner to the word "心". Then, according to the operation of obtaining the model input vector corresponding to the training sample in the method of training the model, feature vectors corresponding to all words of the corpus are combined to obtain a model input vector corresponding to the corpus.

Figure 8:
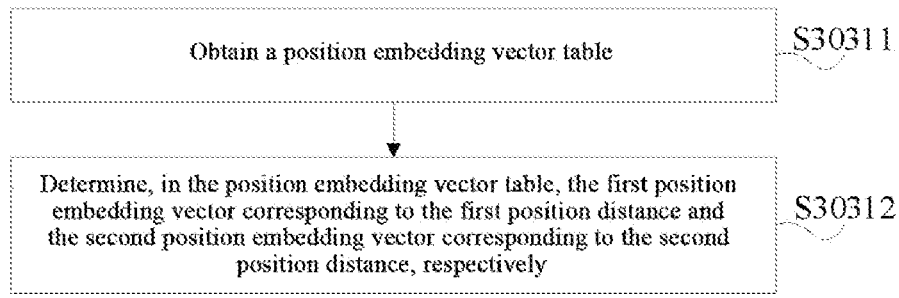
FIG. 8 is a schematic flowchart of sub-steps of S3031 in FIG. 7.

In an example, referring to FIG. 8, FIG. 8 is a schematic flowchart of sub-steps of S3031 in FIG. 7. As a possible implementation, S3031 includes the following blocks.

At block S30311, a position embedding vector table is obtained.

At block S30312, a first position embedding vector and a second position embedding vector corresponding to the first position distance and the second position distance respectively are determined in the position embedding vector table.

That is, the block S30312 refers to: in the position embedding vector table, determining a first position embedding vector corresponding to the first position distance of each word and a second position embedding vector corresponding to the second position distance of each word, respectively.

In the example of the present disclosure, one position vector table is stored in the electronic device. The position vector table stores a correspondence between position distances and position embedding vectors. According to the position vector table, the first position embedding vector corresponding to the first position distance can be obtained, and the second position embedding vector corresponding to the second position distance can be obtained.

For example, the position embedding vector table may be a vector with m*n dimensions, and elements of each column in the position embedding vector table form one specific position embedding vector. The column numbers corresponding to specific values of the first position distance and the second position distance are searched for in the position embedding vector table. All elements in a column corresponding to the first position distance are used as the first position embedding vector corresponding to the first position distance, and all elements in a column corresponding to the second position distance are used as the second position embedding vector corresponding to the second position distance. For example, when the first position distance is "3", the third column in the position embedding vector table is found, and all elements contained in the third column in the position embedding vector table are used as the first position embedding vector. When the second position distance is "33", the 33rd column in the position embedding vector table is found, and all elements contained in the 33rd column in the position embedding vector table are used as the second position embedding vector.

In some other implementations of the present disclosure, a value of a position distance may also be directly used to represent a position embedding vector. For example, in the above example, the first position distance is "3" and the second position distance is "33", then the first position embedding vector is "3" and the second position embedding vector is "33".

In the example of the present disclosure, the representation of the position embedding vector directly using the value of the position distance value may be regarded as a method of representing the position embedding vector by a one-dimensional vector.

As a possible implementation, the position embedding vector table may be generated by Back Propagation (BP) algorithm, before the entity semantic relation type of both of the first entity and the second entity in the corpus is identified by the entity semantic relation classification model.

For example, in generating a position embedding vector table by the BP algorithm, an initial vector table randomly generated is continuously optimized by the BP algorithm to obtain the position embedding vector table.

For example, in one optimization example, a four-layer neural network structure is set, including one input layer $L_1$, two hidden layers $L_2$ and $L_3$, and one output layer $L_4$. The number of neurons in the input layer $L_1$ is set to 10. The number of neurons in the hidden layers $L_2$ and $L_3$ is set to 256. An activation function is set to rectified linear unit ReLU(x)=max(0,x). The number of neurons in the output layer $L_4$ is set to 3. A function of the output layer is set to Soft max(s)=exp($x_i$)/$\Sigma_j$ exp($x_j$), where, i, j=0, 1, 2 ... N, $x_i$, $x_j$ are position vector tables obtained by optimization. An initial network weight is set to w. An error function is set to $\frac{1}{2}\Sigma_{o=1}^{q}(d_o(k)-y_o(k))^2$, where the number of samples k=1, 2, ..., m, $d_o(k)$ represents an expected output for the kth sample, $y_o(k)$ represents an actual output for the kth sample, o=1, 2, 3, ..., q, q represents the number of neurons in the output layer, and m represents the total number of training samples in one training. A learning rate ln is set to 0.01. The maximum number of times of learning is 20000 times.

In an optimization process, first, an input and output of each neuron in the hidden layers are calculated by inputting multiple initial vector tables as initial samples and their corresponding sample labels; then, a partial derivative $\delta_o(m)$ of the error function for each neuron in the output layer is calculated with the expected output and the actual output of the network; then a partial derivative $\delta_h(m)a$ of the error function for each neuron in the hidden layers is calculated with the connection weight of the hidden layers to the output layer, the partial derivatives $\delta_o(m)$ of the output layer and the output of the hidden layers; then the connection weight w is corrected with the partial derivative $\delta_o(m)$ of each neuron in the output layer and the output of each neuron in the hidden layers, and the connection weight w is corrected with the partial derivative $\delta_k(m)a$ of each neuron in the hidden layers and the input of each neuron in the input layer; then in each loop, a global error $$E = \frac{1}{2m}\sum_{k=1}^{m}\sum_{o=1}^{q}(d_o(k) - y_0(k))^2$$

is calculated for the result of the output layer, where the number of samples k=1, 2, . . . , m, $d_o(k)$ represents an expected output for the kth sample, $y_o(k)$ represents an actual output for the kth sample, o=1, 2, 3, . . . , q, q represents the number of neurons in the output layer, and m represents the total number of training samples in one training; the learning is stopped when the global error is less than a preset threshold, and the output result of the output layer at the last learning are used as a position embedding vector table; Or, when the global error is not less than the preset threshold, but the number of times of learning reaches 20,000 times, the learning is also stopped, and the output result of the output layer at the last learning are used as a position embedding vector table.

Figure 9:
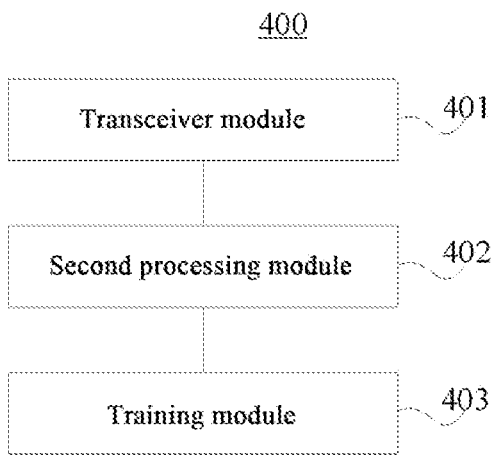
FIG. 9 is a schematic structural diagram of an apparatus for training an entity semantic relation classification model according to an example of the present disclosure.

Referring to FIG. 9, FIG. 9 is a schematic structural diagram of an apparatus for training an entity semantic relation classification model 400 according to an example of the present disclosure, which is applied to an electronic device in which one entity semantic relation classification model is preset. The apparatus for training an entity semantic relation classification model 400 includes a transceiver module 401, a second processing module 402, and a training module 403.

The transceiver module 401 is to receive at least one training sample, and identify a first entity and a second entity of each of the at least one training sample.

The second processing module 420 is to obtain, for each of the at least one training sample, a first position distance between each word in the training sample and the first entity of the training sample, and a second position distance between each word in the training sample and the second entity of the training sample.

The second processing module 402 is further to combine feature vectors corresponding to all words in each of the at least one training sample to obtain a model input vector corresponding to this training sample, wherein, a feature vector corresponding to each word is obtained by combining a word vector corresponding to this word and position embedding vectors corresponding to this word, wherein the position embedding vectors corresponding to this word comprise a vector corresponding to the first position distance of this word and a vector corresponding to the second position distance of this word.

The training module 403 is to train the entity semantic relation classification model by using a model input vector corresponding to each of the at least one training sample as an input of the entity semantic relation classification model.

In an example, as a possible implementation, the training module 403 may be to:

obtain a predicted entity semantic relation type corresponding to each of the at least one training sample obtained by the entity semantic relation classification model by using a model input vector corresponding to this training sample as an input of the entity semantic relation classification model, wherein the predicted entity semantic relation type is a predicted entity semantic relation type of both of the first entity and the second entity in this training sample;

obtain a deviation value between the predicted entity semantic relation type and a preset entity semantic relation type corresponding to each of the at least one training sample, wherein the preset entity semantic relation type is a pre-stored entity semantic relation type of both of the first entity and the second entity corresponding to this training sample;

obtain a sum of the deviation values of all training samples; and when the sum of the deviation values is larger than a first deviation threshold, adjust parameters in the entity semantic relation classification model, to train the entity semantic relation classification model.

In an example, as another possible implementation, the training module 403 may be to:

obtain a predicted entity semantic relation type corresponding to each of the at least one training sample obtained by the entity semantic relation classification model by using a model input vector corresponding to this training sample as an input of the entity semantic relation classification model, wherein the predicted entity semantic relation type is a predicted entity semantic relation type of both of the first entity and the second entity in this training sample;

obtain a deviation value between the predicted entity semantic relation type and a preset entity semantic relation type corresponding to each of the at least one training sample, wherein the preset entity semantic relation type is a pre-stored entity semantic relation type of both of the first entity and the second entity corresponding to this training sample; and when a deviation value of a target training sample in the at least one training sample is larger than a second deviation threshold, adjust parameters in the entity semantic relation classification model, to train the entity semantic relation classification model.

In an example, as a possible implementation, the entity semantic relation classification model is a model of a combination of BiGRU with Attention mechanism, the training module 403 may be to:

adjust a weight coefficient and an offset coefficient of a gated recurrent neural network (GRU) layer and an attention matrix of an attention layer in the entity semantic relation classification model.

In an example, as a possible implementation, each neuron of the GRU layer in the entity semantic relation classification model is not discarded during training.

In an example, as a possible implementation, the entity semantic relation classification model is a model of a combination of BiGRU with Attention mechanism.

The at least one training sample is at least one electronic medical record, and the model input vector corresponding to the training sample is a combination of n feature vectors, wherein n is an average number of words contained in the at least one electronic medical record.

Figure 10:
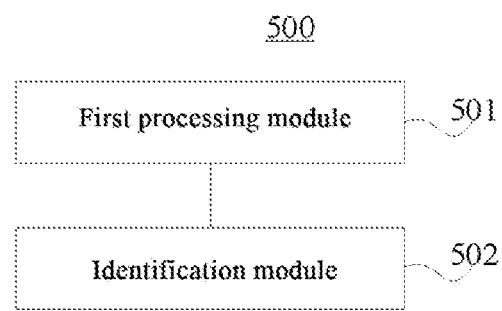
FIG. 10 is a schematic structural diagram of an apparatus for classifying an entity semantic relation according to an example of the present disclosure.

Referring to FIG. 10, FIG. 10 is a schematic structural diagram of an entity semantic relation classification apparatus 500 according to an example of the present disclosure, which is applied to an electronic device in which one entity semantic relation classification model is preset. The entity semantic relation classification apparatus 500 includes a first processing module 501 and an identification module 502.

The first processing module 501 is to determine a first entity and a second entity in a corpus.

The first processing module 501 is further to obtain, for each word in the corpus, a first position distance between this word and the first entity and a second position distance between this word and the second entity.

The identification module 502 is to combine feature vectors corresponding to all words in the corpus to obtain a model input vector corresponding to the corpus, wherein a feature vector corresponding to each word in the corpus is obtained by combining a word vector corresponding to this word and position embedding vectors corresponding to this word, wherein the position embedding vectors corresponding to this word comprise a vector corresponding to the first position distance of this word and a vector corresponding to the second position distance of this word.

In an example, as a possible implementation, the first processing module 501 may be to:
  obtain a word vector corresponding to each word in the corpus, and obtain a first position embedding vector corresponding to the first position distance of each word and a second position embedding vector corresponding to the second position distance of each word;
  combine the word vector, the first position embedding vector and the second position embedding vector corresponding to each word in the corpus to obtain a feature vector corresponding to this word; and
  combine feature vectors corresponding to all of the words in the corpus to obtain the model input vector corresponding to the corpus.

In an example, as a possible implementation, the first processing module 501 may be to:
  obtain a position embedding vector table, wherein, the position embedding vector table records a correspondence between position distances and position embedding vectors; and
  determine, in the position embedding vector table, the first position embedding vector corresponding to the first position distance of each word and the second position embedding vector corresponding to the second position distance of each word, respectively.

In an example, as a possible implementation, the entity semantic relation classification model is a model of a combination of BiGRU with Attention mechanism, and the corpus is an electronic medical record.

An electronic device is provided according to an example of the present disclosure. The electronic device includes a memory and a processor.

The memory is to store one or more programs and one preset entity semantic relation classification model.

One or more programs are executed by the processor, so as to cause the processor to perform operations of:
  receiving at least one training sample, and identifying a first entity and a second entity of each of the at least one training sample;
  for each of the at least one training sample, obtaining a first position distance between each word in the training sample and the first entity of the training sample, and obtaining a second position distance between each word in the training sample and the second entity of the training sample;
  combining feature vectors corresponding to all words in each of the at least one training sample to obtain a model input vector corresponding to this training sample, wherein, a feature vector corresponding to each word is obtained by combining a word vector corresponding to this word and position embedding vectors corresponding to this word, wherein the position embedding vectors corresponding to this word comprise a vector corresponding to the first position distance of this word and a vector corresponding to the second position distance of this word; and
  training the entity semantic relation classification model by using a model input vector corresponding to each of the at least one training sample as an input of the entity semantic relation classification model.

In an example, one or more programs are executed by the processor, so as to cause the processor to perform operations of:
  obtaining a predicted entity semantic relation type corresponding to each of the at least one training sample obtained by the entity semantic relation classification model by using a model input vector corresponding to this training sample as an input of the entity semantic relation classification model, wherein the predicted entity semantic relation type is a predicted entity semantic relation type of both of the first entity and the second entity in this training sample;
  obtaining a deviation value between the predicted entity semantic relation type and a preset entity semantic relation type corresponding to each of the at least one training sample, wherein the preset entity semantic relation type is a pre-stored entity semantic relation type of both of the first entity and the second entity corresponding to this training sample;
  obtaining a sum of the deviation values of all training samples; and
  when the sum of the deviation values is larger than a first deviation threshold, adjusting parameters in the entity semantic relation classification model, to train the entity semantic relation classification model.

In an example, one or more programs are executed by the processor, so as to cause the processor to perform operations of:
  obtaining a predicted entity semantic relation type corresponding to each of the at least one training sample obtained by the entity semantic relation classification model by using a model input vector corresponding to this training sample as an input of the entity semantic relation classification model, wherein the predicted entity semantic relation type is a predicted entity semantic relation type of both of the first entity and the second entity in this training sample;
  obtaining a deviation value between the predicted entity semantic relation type and a preset entity semantic relation type corresponding to each of the at least one training sample, wherein the preset entity semantic relation type is a pre-stored entity semantic relation type of both of the first entity and the second entity corresponding to this training sample; and
  when a deviation value of a target training sample in the at least one training sample is larger than a second deviation threshold, adjusting parameters in the entity semantic relation classification model, to train the entity semantic relation classification model.

In an example, the entity semantic relation classification model is a model of a combination of BiGRU with Attention mechanism.

One or more programs are executed by the processor, so as to cause the processor to perform operations of:

adjusting a weight coefficient and an offset coefficient of a gated recurrent neural network (GRU) layer and an attention matrix of an attention layer in the entity semantic relation classification model.

In an example, each neuron of the GRU layer in the entity semantic relation classification model is not discarded during training.

In an example, the entity semantic relation classification model is a model of a combination of BiGRU with Attention mechanism.

The at least one training sample is at least one electronic medical record, and the model input vector corresponding to the training sample is a combination of n feature vectors, wherein n is an average number of words contained in the at least one electronic medical record.

An electronic device is provided according to an example of the present disclosure. The electronic device includes a memory and a processor.

The memory is to store one or more programs and one preset entity semantic relation classification model.

One or more programs are executed by the processor, so as to cause the processor to perform operations of:

determining a first entity and a second entity in a corpus;

obtaining, for each word in the corpus, a first position distance between this word and the first entity and a second position distance between this word and the second entity;

combining feature vectors corresponding to all words in the corpus to obtain a model input vector corresponding to the corpus, wherein a feature vector corresponding to each word in the corpus is obtained by combining a word vector corresponding to this word and position embedding vectors corresponding to this word, wherein the position embedding vectors corresponding to this word comprise a vector corresponding to the first position distance of this word and a vector corresponding to the second position distance of this word; and determining an entity semantic relation type of both of the first entity and the second entity by using the model input vector corresponding to the corpus as an input of the entity semantic relation classification model.

In an example, one or more programs are executed by the processor, so as to cause the processor to perform operations of:

obtaining a word vector corresponding to each word in the corpus, and obtaining a first position embedding vector corresponding to the first position distance of each word and a second position embedding vector corresponding to the second position distance of each word;

combining the word vector, the first position embedding vector and the second position embedding vector corresponding to each word in the corpus to obtain a feature vector corresponding to this word; and combining feature vectors corresponding to all of the words in the corpus to obtain the model input vector corresponding to the corpus.

In an example, one or more programs are executed by the processor, so as to cause the processor to perform operations of:

obtaining a position embedding vector table, wherein, the position embedding vector table records a correspondence between position distances and position embedding vectors; and determining, in the position embedding vector table, the first position embedding vector corresponding to the first position distance of each word and the second position embedding vector corresponding to the second position distance of each word, respectively.

In an example, the entity semantic relation classification model is a model of a combination of BiGRU with Attention mechanism, and the corpus is an electronic medical record.

An example of the present disclosure further provides a computer readable storage media for storing a computer program and a preset entity semantic relation classification model are stored therein. The computer program is executed by a processor, so as to cause the processor to perform operations of:

determining a first entity and a second entity in a corpus;

obtaining, for each word in the corpus, a first position distance between this word and the first entity and a second position distance between this word and the second entity;

combining feature vectors corresponding to all words in the corpus to obtain a model input vector corresponding to the corpus, wherein a feature vector corresponding to each word in the corpus is obtained by combining a word vector corresponding to this word and position embedding vectors corresponding to this word, wherein the position embedding vectors corresponding to this word comprise a vector corresponding to the first position distance of this word and a vector corresponding to the second position distance of this word; and determining an entity semantic relation type of both of the first entity and the second entity by using the model input vector corresponding to the corpus as an input of the entity semantic relation classification model.

An example of the present disclosure further provides a computer readable storage media for storing a computer program and one preset entity semantic relation classification model therein. The computer program is executed by a processor, so as to cause the processor to perform operations of:

receiving at least one training sample, and identifying a first entity and a second entity of each of the at least one training sample;

for each of the at least one training sample, obtaining a first position distance between each word in the training sample and the first entity of the training sample, and obtaining a second position distance between each word in the training sample and the second entity of the training sample;

combining feature vectors corresponding to all words in each of the at least one training sample to obtain a model input vector corresponding to this training sample, wherein, a feature vector corresponding to each word is obtained by combining a word vector corresponding to this word and position embedding vectors corresponding to this word, wherein the position embedding vectors corresponding to this word comprise a vector corresponding to the first position distance of this word and a vector corresponding to the second position distance of this word; and training the entity semantic relation classification model by using a model input vector corresponding to each of the at least one training sample as an input of the entity semantic relation classification model.

An example of the present disclosure further provides a computer program. The computer program is executed by a processor, so as to cause the processor to perform operations of:

determining a first entity and a second entity in a corpus;

obtaining, for each word in the corpus, a first position distance between this word and the first entity and a second position distance between this word and the second entity;

combining feature vectors corresponding to all words in the corpus to obtain a model input vector corresponding to the corpus, wherein a feature vector corresponding to each word in the corpus is obtained by combining a word vector corresponding to this word and position embedding vectors corresponding to this word, wherein the position embedding vectors corresponding to this word comprise a vector corresponding to the first position distance of this word and a vector corresponding to the second position distance of this word; and determining an entity semantic relation type of both of the first entity and the second entity by using the model input vector corresponding to the corpus as an input of a preset entity semantic relation classification model.

An example of the present disclosure further provides a computer program. The computer program is executed by a processor, so as to cause the processor to perform operations of:

receiving at least one training sample, and identifying a first entity and a second entity of each of the at least one training sample;

for each of the at least one training sample, obtaining a first position distance between each word in the training sample and the first entity of the training sample, and obtaining a second position distance between each word in the training sample and the second entity of the training sample;

combining feature vectors corresponding to all words in each of the at least one training sample to obtain a model input vector corresponding to this training sample, wherein, a feature vector corresponding to each word is obtained by combining a word vector corresponding to this word and position embedding vectors corresponding to this word, wherein the position embedding vectors corresponding to this word comprise a vector corresponding to the first position distance of this word and a vector corresponding to the second position distance of this word; and training a preset entity semantic relation classification model by using a model input vector corresponding to each of the at least one training sample as an input of the entity semantic relation classification model.

In the example provided by the disclosure, the disclosed apparatus and method can also be realized in other ways. The apparatus examples described above are merely exemplary. For example, the flowchart and block diagram in the accompanying drawings show the possible architecture, functions, and operations of the apparatus, method, and computer program product according to the examples of the present disclosure. In this regard, each block in the flowchart and the block diagram represents one module, program segment, or a part of codes, which contain one or more executable instructions for implementing a specified logical function. It should also be noted that in some alternative implementations, the functions marked in the blocks may also occur in a different order than those marked in the drawings. For example, two continuous blocks may actually be executed substantially in parallel, and they may sometimes be executed in a reverse order, depending on the functions involved. It should also be noted that, each block in the flowchart and the block diagram, and a combination of blocks in the flowchart and the block diagram may be implemented in a dedicated hardware-based system that performs specified functions or actions, or may be implemented with a combination of dedicated hardware and computer instructions.

In addition, the functional modules in the examples of the present disclosure may be integrated together to form an independent part, or each module may exist separately, or two or more modules may be integrated to form an independent part.

If the functions are implemented in the form of software functional modules and sold or used as independent products, they may be stored in a computer readable storage medium. Based on this understanding, the technical solution of the present disclosure, in essence, or a part contributing to the prior art or the part of the technical solution can be embodied in the form of a software product, the computer software product is stored in one storage medium, including several instructions to cause one computer device (which may be a personal computer, a server or a network device, etc.) to perform all or part of steps of the method of the example of the present disclosure. The storage medium includes medium capable of storing program code, such as a USB flash disk, a mobile hard disk, a Read Only Memory (ROM), a Random Access Memory (RAM), a magnetic disk, or an optical disk.

Above all, in an method and apparatus for classifying an entity semantic relation, a method and apparatus for training a model, electronic device, storage medium and computer program provided by the examples of the present disclosure, the first entity and the second entity in the corpus are obtained; according to the first position distance between each word in the corpus and the first entity and the second position distance between each word in the corpus and the second entity, a feature vector corresponding to each word are obtained; the features vectors corresponding to all words in the corpus are combined to obtain the model input vector; and then an entity semantic relation type corresponding to the corpus is obtained by using the model input vector corresponding to the corpus as an input of the entity semantic relation classification model. Compared with related technology, the technical solutions of the present disclosure can improve the accuracy of classifying an entity semantic relation.

The above is only preferred examples of the present disclosure, and is not intended to limit the present disclosure. For those skilled in the art, the present disclosure may have various modifications and changes. Any modifications, equivalents, improvements or the like within the spirit and principle of the disclosure should be included in the scope of the disclosure.

For those skilled in the art, it is clear that the present disclosure is not limited to the details of the above examples, and can be realized in other specific forms without departing from the spirit or basic features of the disclosure. Therefore, no matter from which point of view, the examples should be regarded as exemplary and non-limiting. The scope of the disclosure is limited by the appended claims rather than the above description. Therefore, the purpose is to include all changes in the meaning and scope of the equivalent elements of the claims in the disclosure. Any reference signs in the claims shall not be regarded as limiting the claims involved.

What is claimed is:

1. A method for training an entity semantic relation classification model, which is applied to an electronic device in which an entity semantic relation classification model is preset, wherein the method comprises:

receiving at least one training sample, and identifying a first entity and a second entity of each of the at least one training sample, wherein the first entity and the second entity are obtained by identifying entity identifiers in the training sample or identifying the training sample by searching a preset entity library which stores multiple entities through the electronic device, and wherein the at least one training sample is in a form of text and is at least one electronic medical record;

for each of the at least one training sample, obtaining a first position distance between each word in the training sample and the first entity of the training sample, and obtaining a second position distance between each word in the training sample and the second entity of the training sample, wherein the first position distance is determined based on the number of words and the number of punctuation marks between each word and the first entity and the second position distance is determined based on the number of words and the number of punctuation marks between each word and the second entity;

vectoring each word to obtain a word vector by a word vector table for converting a word into a vector, and vectoring the first position distance and the second position distance of each word to obtain position embedding vectors corresponding to this word by a position embedding vector table for converting a position distance into a vector; then combining the word vector corresponding to each word and the position embedding vectors corresponding to the first position distance and the second position distance of this word to obtain a feature vector corresponding to this word; and combining feature vectors corresponding to all words in each of the at least one training sample to obtain a model input vector corresponding to this training sample, wherein the model input vector corresponding to the training sample is a combination of n feature vectors, wherein n is an average number of words contained in the at least one training sample; and training the entity semantic relation classification model by using a model input vector corresponding to each of the at least one training sample as an input of the entity semantic relation classification model, to use the trained entity semantic relation classification model to mine entities in the electronic medical record and classify an entity semantic relation.

2. The method of claim 1, wherein, training the entity semantic relation classification model by using a model input vector corresponding to each of the at least one training sample as an input of the entity semantic relation classification model comprises:

obtaining a predicted entity semantic relation type corresponding to each of the at least one training sample obtained by the entity semantic relation classification model by using a model input vector corresponding to this training sample as an input of the entity semantic relation classification model, wherein the predicted entity semantic relation type is a predicted entity semantic relation type of both of the first entity and the second entity in this training sample;

obtaining a deviation value between the predicted entity semantic relation type and a preset entity semantic relation type corresponding to each of the at least one training sample, wherein the preset entity semantic relation type is a pre-stored entity semantic relation type of both of the first entity and the second entity corresponding to this training sample;

obtaining a sum of the deviation values of all training samples; and when the sum of the deviation values is larger than a first deviation threshold, adjusting parameters in the entity semantic relation classification model, to train the entity semantic relation classification model.

3. The method of claim 2, wherein, the entity semantic relation classification model is a model of a combination of a bidirectional gated recurrent neural network (BiGRU) with an Attention mechanism, and adjusting parameters in the entity semantic relation classification model comprises:

adjusting a weight coefficient and an offset coefficient of a gated recurrent neural network (GRU) layer and an attention matrix of an attention layer in the entity semantic relation classification model.

4. The method of claim 1, wherein, training the entity semantic relation classification model by using a model input vector corresponding to each of the at least one training sample as an input of the entity semantic relation classification model comprises:

obtaining a predicted entity semantic relation type corresponding to each of the at least one training sample obtained by the entity semantic relation classification model by using a model input vector corresponding to this training sample as an input of the entity semantic relation classification model, wherein the predicted entity semantic relation type is a predicted entity semantic relation type of both of the first entity and the second entity in this training sample;

obtaining a deviation value between the predicted entity semantic relation type and a preset entity semantic relation type corresponding to each of the at least one training sample, wherein the preset entity semantic relation type is a pre-stored entity semantic relation type of both of the first entity and the second entity corresponding to this training sample; and when a deviation value of a target training sample in the at least one training sample is larger than a second deviation threshold, adjusting parameters in the entity semantic relation classification model, to train the entity semantic relation classification model.

5. The method of claim 1, wherein, the entity semantic relation classification model is a model of a combination of a bidirectional gated recurrent neural network (BiGRU) with an Attention mechanism.

6. The method of claim 1, further comprising:

determining a first entity and a second entity in a corpus;

obtaining, for each word in the corpus, a first position distance between this word and the first entity and a second position distance between this word and the second entity;

combining feature vectors corresponding to all words in the corpus to obtain a model input vector corresponding to the corpus, wherein a feature vector corresponding to each word in the corpus is obtained by combining a word vector corresponding to this word and position embedding vectors corresponding to this word, wherein the position embedding vectors corresponding to this word comprise a vector corresponding to the first position distance of this word and a vector corresponding to the second position distance of this word; and determining an entity semantic relation type of both of the first entity and the second entity by using the model input vector corresponding to the corpus as an input of the trained entity semantic relation classification model.

7. The method of claim 6, wherein, combining feature vectors corresponding to all words in the corpus to obtain a model input vector corresponding to the corpus comprises:

obtaining a word vector corresponding to each word in the corpus, and obtaining a first position embedding vector corresponding to the first position distance of each word and a second position embedding vector corresponding to the second position distance of each word;

combining the word vector, the first position embedding vector and the second position embedding vector corresponding to each word in the corpus to obtain a feature vector corresponding to this word; and combining feature vectors corresponding to all of the words in the corpus to obtain the model input vector corresponding to the corpus.

8. The method of claim 7, wherein, obtaining a first position embedding vector corresponding to the first position distance of each word and a second position embedding vector corresponding to the second position distance of each word comprises:

obtaining a position embedding vector table, wherein, the position embedding vector table records a correspondence between position distances and position embedding vectors; and determining, in the position embedding vector table, the first position embedding vector corresponding to the first position distance of each word and the second position embedding vector corresponding to the second position distance of each word, respectively.

9. An electronic device, comprising:

a memory, to store one or more programs and a preset entity semantic relation classification model; and a processor;

wherein the one or more programs are executed by the processor, so as to cause the processor to perform steps of the method according to claim 4.

10. The electronic device of claim 9, wherein, the one or more programs are executed by the processor, so as to cause the processor to perform operations of:

obtaining a predicted entity semantic relation type corresponding to each of the at least one training sample obtained by the entity semantic relation classification model by using a model input vector corresponding to this training sample as an input of the entity semantic relation classification model, wherein the predicted entity semantic relation type is a predicted entity semantic relation type of both of the first entity and the second entity in this training sample;

obtaining a deviation value between the predicted entity semantic relation type and a preset entity semantic relation type corresponding to each of the at least one training sample, wherein the preset entity semantic relation type is a pre-stored entity semantic relation type of both of the first entity and the second entity corresponding to this training sample;

obtaining a sum of the deviation values of all training samples; and when the sum of the deviation values is larger than a first deviation threshold, adjusting parameters in the entity semantic relation classification model, to train the entity semantic relation classification model.

11. The electronic device of claim 9, wherein, the one or more programs are executed by the processor, so as to cause the processor to perform operations of:

obtaining a predicted entity semantic relation type corresponding to each of the at least one training sample obtained by the entity semantic relation classification model by using a model input vector corresponding to this training sample as an input of the entity semantic relation classification model, wherein the predicted entity semantic relation type is a predicted entity semantic relation type of both of the first entity and the second entity in this training sample;

obtaining a deviation value between the predicted entity semantic relation type and a preset entity semantic relation type corresponding to each of the at least one training sample, wherein the preset entity semantic relation type is a pre-stored entity semantic relation type of both of the first entity and the second entity corresponding to this training sample; and when a deviation value of a target training sample in the at least one training sample is larger than a second deviation threshold, adjusting parameters in the entity semantic relation classification model, to train the entity semantic relation classification model.

12. The electronic device of claim 9, wherein, the entity semantic relation classification model is a model of a combination of a bidirectional gated recurrent neural network (BiGRU) with an Attention mechanism;

the at least one training sample is at least one electronic medical record, and the model input vector corresponding to the training sample is a combination of n feature vectors, wherein n is an average number of words contained in the at least one electronic medical record.

13. The electronic device of claim 9, wherein, the one or more programs are executed by the processor, so as to cause the processor to perform operations of:

determining a first entity and a second entity in a corpus;

obtaining, for each word in the corpus, a first position distance between this word and the first entity and a second position distance between this word and the second entity;

combining feature vectors corresponding to all words in the corpus to obtain a model input vector corresponding to the corpus, wherein a feature vector corresponding to each word in the corpus is obtained by combining a word vector corresponding to this word and position embedding vectors corresponding to this word, wherein the position embedding vectors corresponding to this word comprise a vector corresponding to the first position distance of this word and a vector corresponding to the second position distance of this word; and determining an entity semantic relation type of both of the first entity and the second entity by using the model input vector corresponding to the corpus as an input of the trained entity semantic relation classification model.

14. The electronic device of claim 13, wherein, the one or more programs are executed by the processor, so as to cause the processor to perform operations of:

obtaining a word vector corresponding to each word in the corpus, and obtaining a first position embedding vector corresponding to the first position distance of each word and a second position embedding vector corresponding to the second position distance of each word;

combining the word vector, the first position embedding vector and the second position embedding vector corresponding to each word in the corpus to obtain a feature vector corresponding to this word; and combining feature vectors corresponding to all of the words in the corpus to obtain the model input vector corresponding to the corpus.

15. The electronic device of claim 14, wherein, the one or more programs are executed by the processor, so as to cause the processor to perform operations of:

obtaining a position embedding vector table, wherein, the position embedding vector table records a correspondence between position distances and position embedding vectors; and determining, in the position embedding vector table, the first position embedding vector corresponding to the first position distance of each word and the second position embedding vector corresponding to the second position distance of each word, respectively.

* * * * *